United States Patent
Lota et al.

(10) Patent No.: US 8,141,759 B2
(45) Date of Patent: Mar. 27, 2012

(54) CONTAINER ASSEMBLY FOR A MOTOR VEHICLE

(75) Inventors: Charan Singh Lota, Canton, MI (US); Joel T. Runyan, Wayne, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1060 days.

(21) Appl. No.: 11/970,717

(22) Filed: Jan. 8, 2008

(65) Prior Publication Data

US 2009/0174210 A1    Jul. 9, 2009

(51) Int. Cl.
*B60R 7/06*    (2006.01)

(52) U.S. Cl. ........ 224/483; 224/282; 220/827; 220/830; 296/37.12

(58) Field of Classification Search ................. 224/282, 224/483, 926, 928, 275, 278; 220/810, 825, 220/827, 830, 831, 832, 254.5; 296/37.1, 296/37.12, 37.8, 37.9; 16/278, 280, 281, 16/375
See application file for complete search history.

(56) References Cited

U.S. PATENT DOCUMENTS

| | | | |
|---|---|---|---|
| 736,714 A * | 8/1903 | Gendron | 16/401 |
| 4,568,117 A | 2/1986 | McElfish et al. | |
| 5,381,586 A | 1/1995 | Busscher et al. | |
| 5,489,054 A | 2/1996 | Schiff | |
| 5,505,516 A | 4/1996 | Spykerman et al. | |
| 5,533,772 A | 7/1996 | Volkers et al. | |
| 5,639,002 A * | 6/1997 | Weitbrecht et al. | 224/539 |
| 5,680,974 A | 10/1997 | Vander Sluis | |
| 5,901,885 A * | 5/1999 | Iida | 222/517 |
| 6,019,334 A * | 2/2000 | Shinomiya | 248/311.2 |
| 6,065,729 A * | 5/2000 | Anderson | 248/311.2 |
| 6,131,242 A * | 10/2000 | Zipperle et al. | 16/82 |
| 6,766,563 B2 * | 7/2004 | Lee | 16/286 |
| 6,883,680 B2 * | 4/2005 | Hirose | 220/830 |
| 7,017,956 B2 | 3/2006 | Kogami et al. | |
| 7,064,285 B2 * | 6/2006 | Ichimaru | 200/293 |
| 2005/0023280 A1 * | 2/2005 | Kondo | 220/263 |
| 2005/0133507 A1 * | 6/2005 | Tanaka | 220/263 |

* cited by examiner

*Primary Examiner* — Justin Larson
*Assistant Examiner* — Steven M Landolfi, Jr.
(74) *Attorney, Agent, or Firm* — Gifford, Krass, Sprinkle, Anderson & Citkowski, P.C.

(57) ABSTRACT

A container assembly for a motor vehicle passenger compartment includes a housing, a door, an arm, a helical spring and a cam. The door is pivotally coupled to the housing for movement about a first pivot between a closed position wherein the door covers an opening in the housing and an open position wherein the door is pivoted about the first pivot to allow access through the opening to a storage space in the housing. The arm is pivotally coupled to the housing for movement about a second pivot. The arm has a cam surface. The helical spring continuously biases the arm toward the first pivot. The cam is coupled to the door and movable with the door about the first pivot between the closed position and the open position. The cam has a center portion and a lobe extending outwardly from the center portion. The lobe remains in contact with the cam surface of the arm. The cam surface applies a torque on one side of the lobe to bias the door toward the closed position and on an opposite side of the lobe to bias the door toward the open position.

13 Claims, 2 Drawing Sheets

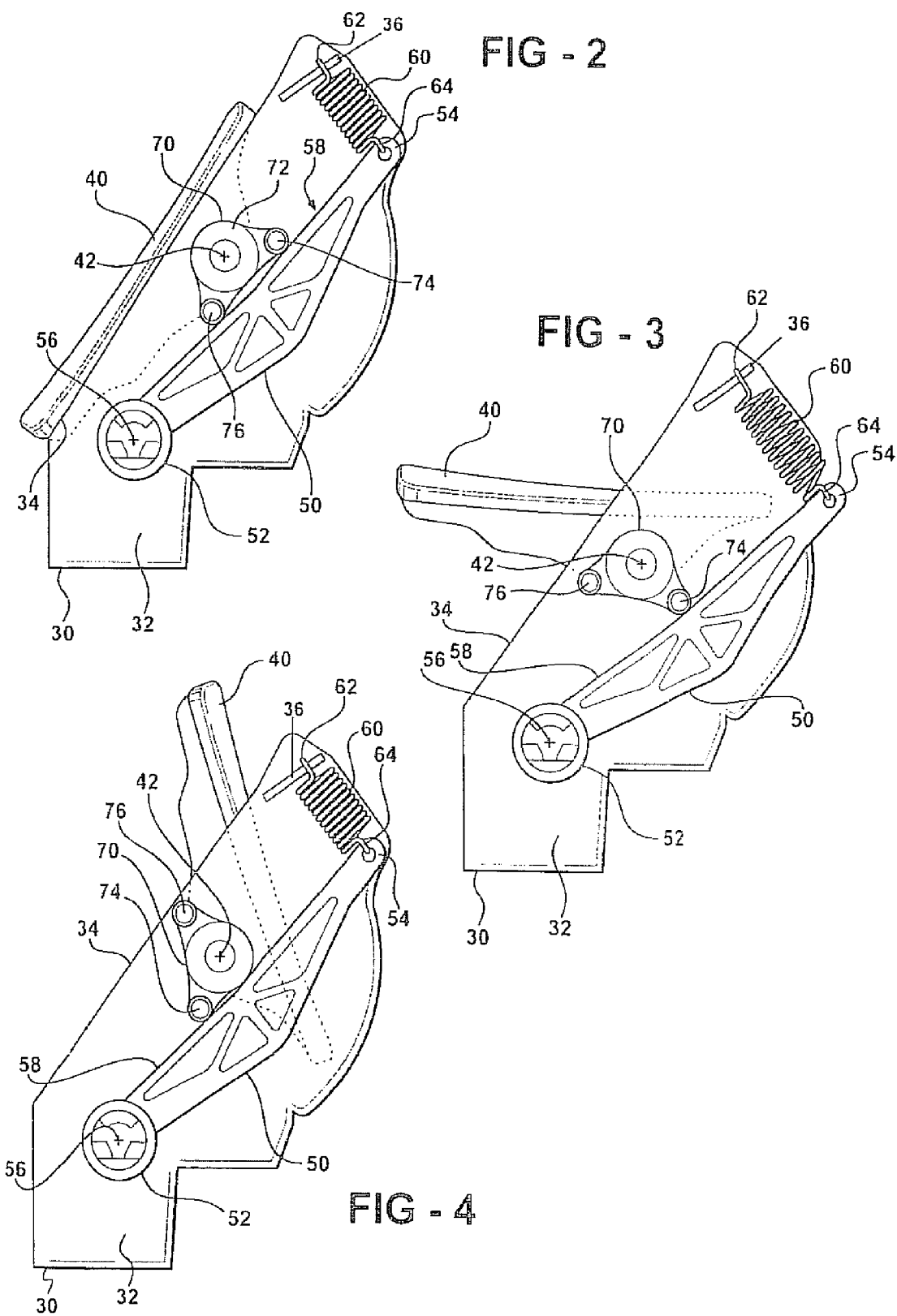

CONTAINER ASSEMBLY FOR A MOTOR VEHICLE

FIELD OF THE INVENTION

The invention relates to a container assembly for use in a passenger compartment of a motor vehicle. More particularly, the invention relates to a biasing mechanism for biasing a door of the container assembly to either a closed position or an open position depending on the position of the door.

BACKGROUND OF THE INVENTION

Motor vehicles typically include bins, compartments and containers located throughout the passenger compartment for storing such items. As vehicle owners carry an ever increasing plurality of accessories and gadgets, such as coins, pens, phones, music players, GPS receivers, satellite radios, personal digital assistants and the like, vehicle manufacturers are, in response to this trend, striving to design storage to manage these accessories within the passenger compartment.

Vehicle manufacturers also recognize the need to improve the tactile feel and function for movable components within the passenger compartment in order to provide an enhanced sense of robustness and overall quality in the vehicle, since it is these things that typically provide the "first impression" to a vehicle buyer and have the potential to sway a vehicle buyer ultimately towards a purchase of a vehicle.

Therefore, it remains desirable to provide improved passenger compartment storage and, in addition, enhanced tactile feel and function to movable components, such as storage compartment doors and the like.

SUMMARY OF THE INVENTION

According to one aspect of the invention, a container assembly is provided for use in a passenger compartment of a motor vehicle. The container assembly includes a housing, a door, an arm, a biasing member and a cam. The housing has a storage space and an opening providing access therethrough to the storage space. The door is pivotally coupled to the housing for movement about a first pivot between a closed position wherein the door covers the opening in the housing and an open position wherein the door is pivoted upwardly about the first pivot to allow access through the opening to the storage space. The arm has opposite proximal and distal ends. The proximal end of the arm is pivotally coupled to the housing and provides movement of the arm about a second pivot. The arm has a cam surface extending between the proximal and distal ends. The biasing member continuously biases the arm toward the first pivot. The cam is coupled to the door and movable with the door about the first pivot between the closed position and the open position. The cam has a center portion. The cam also has first and second lobes disposed on opposite sides of the center portion. Both of the first and second lobes contact the cam surface when the door in the closed position. The cam surface applies a torque upon at least one of the first and second lobes due to the continuous bias of the arm toward the first pivot and, thereby, maintains the door in the closed position.

According to another aspect of the invention, a container assembly is provided for use in passenger compartment of a motor vehicle. The container assembly includes a housing, a door, an arm, a helical spring and a cam. The housing has a storage space and an opening providing access therethrough to the storage space. The door is pivotally coupled to the housing for movement about a first pivot between a closed position wherein the door covers the opening in the housing and an open position wherein the door is pivoted about the first pivot to allow access through the opening to the storage space. The arm is pivotally coupled to a portion of the housing below the opening for movement about a second pivot. The arm has a cam surface. The helical spring has one end coupled to a portion of the housing above the opening and an opposite end coupled to a distal end of the arm for continuously biasing the arm toward the first pivot. The cam is coupled to the door and movable with the door about the first pivot between the closed position and the open position. The cam has a center portion. The cam also has a lobe extending outwardly from the center portion and remaining in contact with the cam surface of the arm. The cam surface applies a torque on one side of the lobe to bias the door toward the closed position and on an opposite side of the lobe to bias the door toward the open position.

BRIEF DESCRIPTION OF THE DRAWINGS

Advantages of the present invention will be readily appreciated as the same becomes better understood by reference to the following detailed description when considered in connection with the accompanying drawings, wherein:

FIG. 2 is a side elevational view of the container assembly with a door shown in a closed position;

FIG. 3 is a side elevational view of the container assembly with the door shown in an overcenter position; and FIG. 4 is a side elevational view of the container assembly with the door shown in an open position.

DETAILED DESCRIPTION OF THE INVENTION

Figure 1:
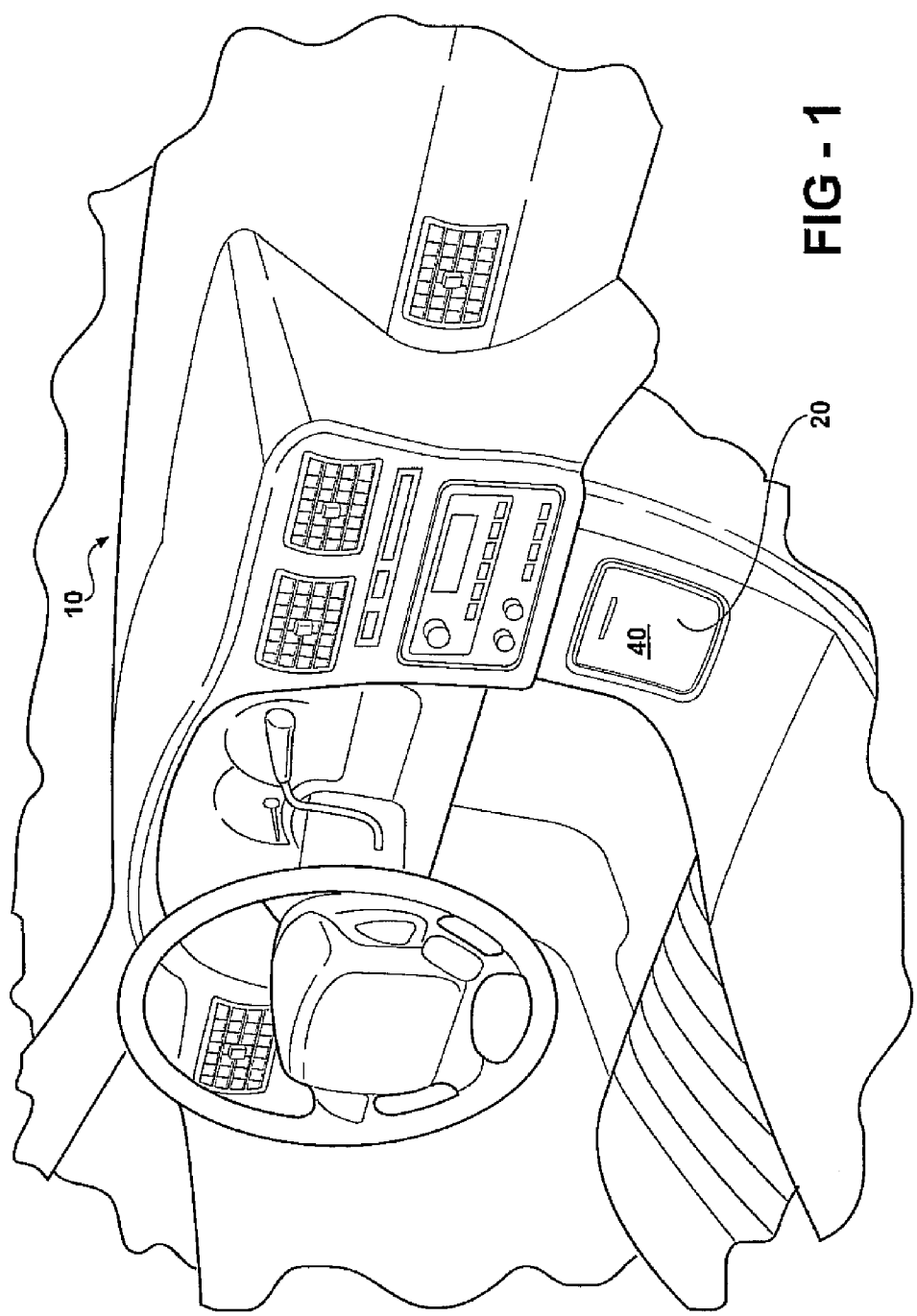
FIG. 1 is a perspective view of an instrument panel in a passenger compartment of a motor vehicle illustrating a container assembly according to one embodiment of the invention.

Referring to the FIG. 1, an instrument panel in a passenger compartment of a motor vehicle is generally indicated at 10. The instrument panel 10 includes a container assembly 20 for storing items, such as coins, pens, phones, music players and the like. Described in greater detail below, the container assembly 20 includes a door 40 selectively movable between closed (shown) and open positions and a biasing arrangement for biasing the door 40 to either of the closed and open positions depending on the position of the door 40.

Referring to FIGS. 2-4, the container assembly 20 also includes a housing 30, an arm 50, a biasing member 60 and a cam 70. The housing 30 has a storage space 32 and an opening 34 providing access therethrough to the storage space 32. The door 40 is pivotally coupled to the housing 30 for movement about a first pivot 42 between a closed position wherein the door 40 covers the opening 34 in the housing 30 and an open position wherein the door 40 is pivoted upwardly about the first pivot 42 to allow access through the opening 34 to the storage space 32.

The arm 50 has opposite proximal 52 and distal 54 ends. The proximal end 52 of the arm 50 is pivotally coupled to the housing 30 and provides movement of the arm 50 about a second pivot 56. The arm 50 has a cam surface 58 extending between the proximal 52 and distal 54 ends. In the illustrated embodiment, tie cam surface 58 is concave.

The biasing member 60 continuously biases the arm 50 toward the first pivot 42. In the illustrated embodiment, the biasing member 60 is a tensioned helical spring having one end 62 coupled to a portion 36 of the housing 30 above the opening 34 and an opposite end 64 coupled to the distal end 54 of the arm 50.

The cam 70 is coupled to the door 40 and movable with the door 40 about the first pivot 42 between the closed position and the open position. The cam 70 has a center portion 72. The cam 70 also has first 74 and second 76 lobes disposed on opposite sides of and extending radially outwardly from the center portion 72. In the illustrated embodiment, the lobes 74, 76 are generally symmetrical with respect to the first axis 42. Both of the first 74 and second 76 lobes contact the cam surface 58 when the door 40 in the closed position. The cam surface 58 applies a torque upon at least one of the first 74 and second 76 lobes due to the continuous bias of the arm 50 toward the first pivot 42. As shown, the cam surface 58 applies torque upon the first lobe 74 and, thereby, maintains the door 40 in the closed position.

In use, the door 40 in the closed position FIG. 2) prevents access to the storage space 32 through the opening 34 in the housing 30. The door 40 is movable to an overcenter position, as shown in FIG. 3, between the closed and open positions, wherein the cam surface 58 applies a force upon the first lobe 74 that extends through the first lobe 74 and the first pivot 42 resulting in substantially no torque being applied upon the cam. In this overcenter position, the door 40 is not biased to either of the closed or open positions. By this arrangement, the cam surface 58 applies torque upon one side of the first lobe 74 and resists movement of the door 40 toward the open position while the door 40 is positioned between the closed position (FIG. 2) and the overcenter position (FIG. 3). Similarly, the cam surface 58 applies torque upon an opposite side of the first lobe 74 and biases the door 40 toward the open position while the door 40 is positioned between the overcenter position (FIG. 3) and the open position (FIG. 4). This arrangement provides for a cost-effective and robust mechanism for ensuring the door is located in either the closed position or the open position. A simple articulation of the door by a user to either side of a predictable and easily learned overcenter position provides for enhanced tactile feel for the user in the closing and opening of the door versus conventional designs.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

We claim:

1. A container assembly for use in a passenger compartment of a motor vehicle, said container assembly comprising:
    a housing having a storage space and an opening providing access to the storage space;
    a door pivotally coupled to the housing for movement about a first pivot between a closed position and an open position so as to allow access to the storage space;
    an arm having opposite proximal and distal ends, the proximal end of the arm being pivotally coupled to the housing and providing movement of the arm about a second pivot, the arm having a cam surface extending between the proximal and distal ends; and
    a biasing member continuously biasing the arm toward the first pivot; and
    a cam coupled to the door and movable about the first pivot, the cam contacting the arm and disposed between the biasing member and the second pivot, the cam having first and second lobes disposed on opposite sides of a center portion, both of the first and second lobes contacting the cam surface when the door is in the closed position, one of either the first or second lobe and the center portion contacting the cam surface so as to place the door in the open position.

2. The container assembly as set forth in claim 1, wherein the door is movable to an overcenter position between the closed and open positions, wherein the cam surface applies a force upon one of the first and second lobes that extends through the one of the first and second lobes and the first pivot resulting in substantially no torque being applied upon the cam.

3. The container assembly as set forth in claim 2, wherein the cam surface applies torque upon one of the first and second lobes and resists movement of the door toward the open position while the door is positioned between the closed position and the overcenter position.

4. The container assembly as set forth in claim 2, wherein the cam surface applies torque upon the one of the first and second lobes and biases the door toward the open position while the door is positioned between the overcenter position and the open position.

5. The container assembly as set forth in claim 1, wherein the first pivot is disposed between the second pivot and the distal end of the arm.

6. The container assembly as set forth in claim 1, wherein the cam surface of the arm is concave.

7. The container assembly as set forth in claim 1, wherein the first and second lobes are substantially symmetrical about the first pivot.

8. The container assembly as set forth in claim 1, wherein the biasing member is a helical spring with one end coupled to a portion of the housing above the opening and an opposite end coupled to the distal end of the arm.

9. A container assembly for use in passenger compartment of a motor vehicle, said container assembly comprising:
    a housing having a storage space and an opening providing access therethrough to the storage space;
    a door pivotally coupled to the housing for movement about a first pivot between a closed position and an open position so as to allow access through the opening to the storage space;
    an arm pivotally coupled to a portion of the housing below the opening for movement about a second pivot, the arm having a cam surface;
    a helical spring having one end coupled to a portion of the housing above the opening and an opposite end coupled to a distal end of the arm for continuously biasing the arm toward the first pivot; and
    a cam coupled to the door and movable about the first pivot, the cam contacting the arm and disposed between the helical spring and the second pivot, the cam having a center portion, the cam having a lobe extending outwardly from the center portion and remaining in contact with the cam surface of the arm, the cam surface applying a torque on one side of the lobe to bias the door toward the closed position and on an opposite side of the lobe to bias the door toward the open position.

10. The container assembly as set forth in claim 9, wherein the cam surface contacts both the lobe and the center portion when the door is in the open position.

11. The container assembly as set forth in claim 9, wherein the first pivot is disposed between the second pivot and the distal end of the arm.

12. The container assembly as set forth in claim 9, wherein the cam surface of the arm is concave.

13. The container assembly as set forth in claim 9, wherein the helical spring is continuously tensioned to continuously bias the arm toward the first pivot.

* * * * *

UNITED STATES PATENT AND TRADEMARK OFFICE
CERTIFICATE OF CORRECTION

| | |
|---|---|
| PATENT NO. | : 8,141,759 B2 |
| APPLICATION NO. | : 11/970717 |
| DATED | : March 27, 2012 |
| INVENTOR(S) | : Charan Singh Lota et al. |

It is certified that error appears in the above-identified patent and that said Letters Patent is hereby corrected as shown below:

Column 1, line number 54, after door, insert --is--.

Column 3, line number 4, after 40, insert --s--.

Column 3, line number 10, after position, insert --(--.

Claim 1, Column 3, line number 54, after ends;, delete "and".

Signed and Sealed this
Twenty-ninth Day of January, 2013

David J. Kappos
*Director of the United States Patent and Trademark Office*